United States Patent
Hussain et al.

(10) Patent No.: US 6,397,071 B1
(45) Date of Patent: *May 28, 2002

(54) SYSTEM AND METHOD FOR CONFIGURING GENERIC EQUIPMENT MEASUREMENT UNITS WITH A MOBILE SERVICES SWITCHING CENTER

(75) Inventors: Tahir Hussain, Dallas; Christopher Kingdon, Garland; Bagher Zadeh, Dallas; Bikash Saha, Plano, all of TX (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/227,985

(22) Filed: Jan. 8, 1999

(51) Int. Cl.[7] .................................................. H04Q 7/20
(52) U.S. Cl. ........................ 455/456; 455/422; 455/440
(58) Field of Search ................................ 455/456, 422, 455/440, 436, 403, 404, 414, 457, 550, 426

(56) References Cited

U.S. PATENT DOCUMENTS

| | | | |
|---|---|---|---|
| 5,909,648 A | * 6/1999 | Boudreaux | 455/422 |
| 5,970,413 A | 10/1999 | Gilhousen | 455/456 |
| 6,006,097 A | * 12/1999 | Hornfeldt | 455/456 |
| 6,011,974 A | 1/2000 | Cedervall | 455/456 |
| 6,091,958 A | 7/2000 | Bergkvist | 455/456 |
| 6,163,696 A | * 12/2000 | Bi | 455/436 |

* cited by examiner

Primary Examiner—Vivian Chang
Assistant Examiner—John J Lee
(74) Attorney, Agent, or Firm—Jenkens & Gilchrist, P.C.

(57) ABSTRACT

A system and method for efficiently utilizing the radio interface in a mobile station positioning capable mobile communications network. A maximum period of mobile station positioning inactivity is allowed after which any system resources, such as semi-permanently allocated control channels, may be deallocated, thereby allowing the control channel or like resource to be utilized for other Switching System/Base Station System communications.

21 Claims, 3 Drawing Sheets

SYSTEM AND METHOD FOR CONFIGURING GENERIC EQUIPMENT MEASUREMENT UNITS WITH A MOBILE SERVICES SWITCHING CENTER

BACKGROUND OF THE INVENTION

1. Technical Field of the Invention

The present invention relates, in general, to mobile communications, in particular, to a system and method for efficient time of arrival measurements of access bursts for mobile station positioning, and, more particularly, to a system and method for the efficient allocation and deallocation of communications resources such as control channels utilized in positioning measurements.

2. Description of Related Art

Mobile radio position determination is an emerging field that has gained a great deal of interest lately, and it is now desirable, as well as required by law, that companies include position determination capability in future cellular mobile radio systems. The Time Difference of Arrival (TDOA) or Time of Arrival (TOA) position determination method has been used successfully for determining the position of mobile radio terminals. A typical TDOA position determination system can be either terminal-based, whereby TOA measurements are made on the "downlink" in the mobile station (MS), or network-based, whereby the network performs the TOA measurements on the "uplink" in the radio base transceiver stations (BTSs). These TOA measurements are then used to calculate TDOA parameters and estimate the MS's position within the telecommunication system.

A network-based method for determining the position of cellular mobile stations is disclosed in commonly-assigned Swedish Patent Application No. 9303561-3 to R. Bodin. In order to determine the position of a mobile station, a handover procedure is initiated between a serving base transceiver station and the mobile station. The mobile station transmits access request signals to a new base transceiver station. The base transceiver station measures the time delay for the access request signal to travel between the mobile station and the base transceiver station. This procedure is repeated between the mobile station and one or more additional base transceiver stations. A service node in the cellular network calculates the position of the mobile station by utilizing information about the known positions of the base transceiver stations and the measured access time delays.

This network-based method of determining the position of cellular mobile stations relies on so-called asynchronous handovers, where the target base transceiver stations measure the access delays to the mobile station. Each access delay is used as a measure of the distance between the mobile station and the respective base transceiver station. At least two positioning handover operations are needed to obtain three such distances, which can be used in a triangulation algorithm to determine the mobile terminal's position. Notably, one distance can be obtained between the serving base transceiver station and the mobile terminal without a positioning handover. For example, in the Global System for Mobile Communications (GSM), the Timing Advance (TA) value used for time alignment of bursts can optionally be used as a representation of the distance in the serving cell. A more accurate position determination can be attained if more than two such positioning handovers are made, because more than three distances will be known. The use of more than three distance measurements compensates for some errors arising in the individual measurements.

Although the above-described document illustrates considerable progress in the cellular position determination field, there are still a number of deficiencies to be improved upon. For instance, in existing GSM systems having TOA-based mobile station positioning capabilities, the determination of a mobile station position is not highly accurate. The calculation of the number of access bursts for reception from a mobile station is based upon the type of application and/or the degree of accuracy specified. In addition, the identification of particular time measuring units for use in measuring the time of arrival of transmitted access burst signals is based upon only a general location of the mobile station, such as information gleaned from cell identification and timing advance (TA) parameters. As a result, mobile network resources may not be optimally utilized in determining mobile station position. Network resources in existing GSM systems may be overly utilized to determine mobile station position, thereby reducing the quality of other services provided by the telecommunications system. Alternatively, network resources may be under utilized, resulting in a less accurate mobile station position determination.

In particular, most recently it has been proposed to have Generic Measurement Units (GEMUs) measure the time of arrival of the access bursts received from the MS being positioned. In this positioning system, a GEMU is located in physical proximity to each BTS of the MS positioning capable network. The GEMU communicates with the Mobile services Switching Center/Visitor Location Register (MSC/VLR) according to the Direct Transfer Application Part (DTAP) of the Signaling System #7 on the Stand alone Dedicated Control Channel (SDCCH). The DTAP setups may be made either dynamically on demand or semi-permanently for each GEMU.

When the DTAP is allocated semi-permanently, however, the respective SDCCH channel is occupied whether or not there is an MS positioning calculation being performed. Thus, the occupied SDCCH channel is unavailable for other use, e.g. call setup, transmission of textual messages such as short message service (SMS) or cell broadcast messages, etc., when allocated semi-permanently even though a positioning calculation may not be currently performed. Consequently, there exists a need for an improved TOA-based, mobile station positioning system which alleviates this resource allocation problem, resulting in a more efficient telecommunications system.

It is, therefore, a first object of the present invention to provide an improved system and method for measuring time of arrival signals in a mobile communications network.

It is another object of the present invention to provide for better resource utilization in a mobile station positioning-capable mobile communications network.

It is yet another object of the present invention to provide improved utilization of the Stand alone Dedicated Control Channel in a mobile positioning procedure in a mobile communications network.

It is still another object of the present invention to provide deallocation of a semi-permanent Direct Transfer Application Part setup and the corresponding Stand alone Dedicated Control Channel after a specified period of mobile station positioning inactivity in a mobile communications network.

SUMMARY OF THE INVENTION

The present invention is directed to a system and method for efficiently utilizing the radio interface in a mobile station positioning capable mobile communications network. After control channel allocation, a maximum or timeout period of mobile station positioning inactivity is allowed after which any semi-permanently allocated control channel may be deallocated, thereby allowing the control channel to be utilized for other Switching System/Base Station System communications.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
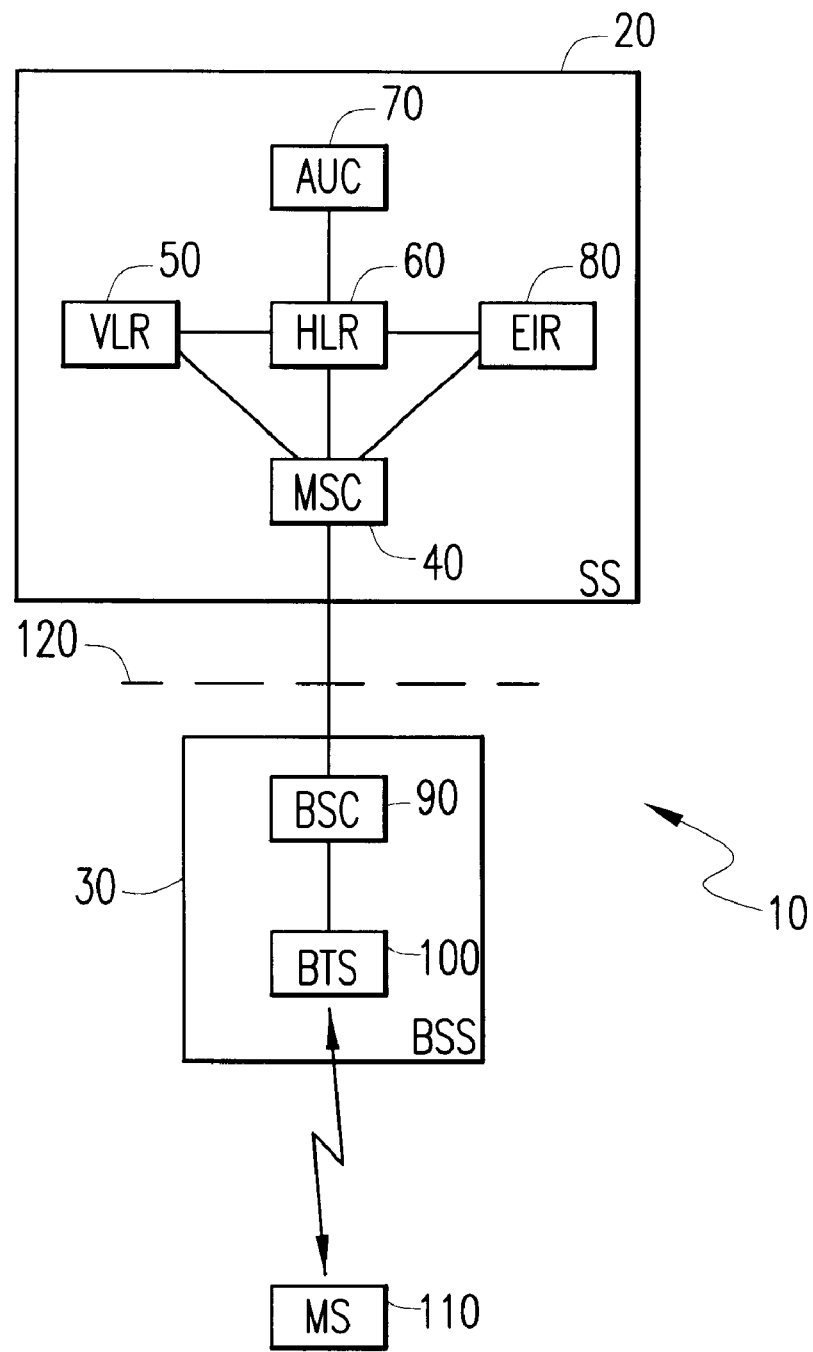
FIG. 1 is an exemplary telecommunications network Switching System and Base Station System on which the present invention may be applied.

In FIG. 1 is shown a simplified telecommunications system, generally designated by the reference numeral 10, on which the present invention may be applied. Telecommunication system 10 is usually divided into a Switching System (§ ) 20 and a Base Station System (BSS) 30. Each of the § 20 and the BSS 30 contains a number of functional units implemented in various hardware and the particular functionalities of each are well understood by those skilled in the art. Specifically, § 20 contains the Mobile services Switching Center (MSC) 40, a Visitor Location Register (VLR) 50, a Home Location Register (HLR) 60, a Authentication Center 70 and an Equipment Identity Register 80. The BSS 30 contains a Base Station Controller (BSC) 90 in communication with and in control of a number of Base Transceiver Stations (BTSs) 100, only one of which is illustrated.

Each individual BTS of a group of BTSs 100 under the control of the BSC 90 define a radio cell operating on a set of radio channels, thereby providing service to a number of Mobile Stations (MSs) 110. An interface 120 between the MSC 40 and the BSC 90 is commonly known as the A-bis interface, which is a 64-kbps digital link supporting a plurality of protocols, including the aforementioned Direct Transfer Application Part or DTAP. DTAP communications include data and other signaling information sent from the base station 30 equipment to the § 20.

Figure 2:
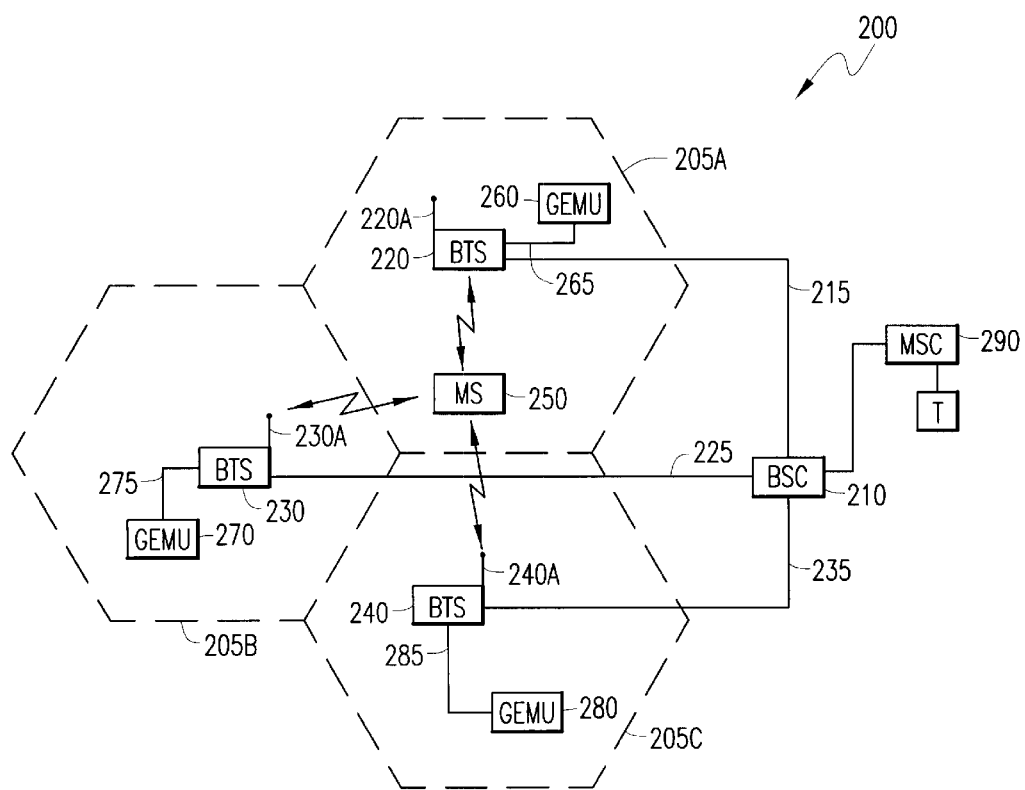
FIG. 2 is a simplified cell layout of a communication system including Generic Equipment Measurement Units necessary for mobile station positioning as performed in a preferred embodiment of the present invention.

With reference now to FIG. 2, there is shown a simplified cell layout of a communication system, generally designated by the reference numeral 200, within which the present invention may be applied. The telecommunication system 200 includes a Base Station Controller (BSC) 210, a number of Base Transceiver Stations (BTSs) 220, 230, and 240 within cells 205A, 205B and 205C, respectively, and each controlled by the BSC 210 via respective communication links 215, 225, and 235 therebetween. A mobile station 250, on which a positioning operation is performed, is also illustrated. As is understood in the art, the antennae of BTSs 220, 230 and 240, designated by the reference numerals 220A, 230A and 240A, respectively, have pointing azimuths with 120 degrees of separation, as commonly represented by the generally hexagonally-shaped dashed lines for the cells 205A, 205B and 205C.

With reference again to FIG. 2, the dashed lines circumscribing each of BTSs 220, 230 and 240 and the position of the MS 250 indicates that MS 250 is currently served by BTS 220. Telecommunication system 200 also includes GEMUs 260, 270 and 280, referred to more generally as Location Measurement Units (LMUs), located in close physical proximity and coupled to BTSs 220, 230 and 240, respectively, by associated communication links 265, 275 and 285. GEMUs 260, 270 and 280 are characterized, in general, as having communication capabilities for receiving and transmitting DTAP messages to the MSC 40 (shown in FIG. 1) via a respective BTS of the BSS 30 and processing means for measuring the time of arrival of access bursts received from the MS 250 subject to being positioned.

As discussed, positioning methods utilizing time of arrival measurements of access bursts of the MS 250 being positioned employ location measurement units such as GEMUs for measuring the time of arrival. Delays between the transmission and reception of the access bursts may then be accepted by a triangulation algorithm for computing the MS 250 position. In the current illustrative example, GEMU 260 would not be required to engage in the access burst time of arrival measurements since MS 250 is actively served by BTS 220. Instead, a TA, or similar data, used for time alignment of bursts between MS 250 and the serving BTS 220 can optionally be used as a representation of the distance between the MS 250 and the BTS 220 in the serving cell, i.e., cell 205A. Thus, GEMUs 270 and 280 in cells 205B and 205C are involved in performing the access burst TOA measurements between the MS 250 and the respective BTSs 230 and 240 necessary to complete the requisite calculation of three distances for an accurate MS 250 triangulation position calculation.

In the presently preferred embodiment, GEMUs 260, 270 and 280 communicate with an MSC 290 via DTAP messaging. In GSM, this messaging occurs on the SDCCH channel and thus requires at least one time slot of the SDCCH per GEMU for each GEMU involved in the TOA measurement. The physical setup of the DTAP messaging between the GEMU and the MSC may occur dynamically on demand or semi-permanently, e.g. at the initialization of the positioning feature. In the case of a semi-permanent DTAP setup between the GEMU and the MSC 290, at least one time slot per GEMU is allocated for positioning purposes, regardless of the current positioning activity or inactivity occurring in the cell, thus resulting in the unavailability of that particular timeslot for other purposes even while it is not being used for a positioning-related TOA measurement.

More efficient resource utilization is realized in the telecommunication system of FIGS. 1 and 2 by providing a positioning related timer in MSCs 40 and 290, respectively, when DTAP positioning messages between GEMUs and the MSC 290 are carried over semi-permanent allocations. The positioning timer, T, is initialized with a maximum positioning idle time and subsequently decremented until it expires or another positioning-related DTAP message is received at the MSC 290. Upon reception of an MS positioning-related DTAP message by the MSC 290 prior to expiration of timer T, the timer is reinitialized with the maximum positioning idle time and decrementation of timer T is restarted. Since a positioning calculation is immediately impending upon reception of a positioning-related DTAP message at the MSC 290, it is necessary that the maximum positioning idle time that the timer T is initialized to is greater than the estimated time for a positioning calculation process.

If, however, the positioning timer T expires prior to the MSC 290 receiving another MS positioning-related DTAP message, the semi-permanently allocated DTAP channel is released, thereby allowing the corresponding timeslot of the SDCCH for other control channel usage. The DTAP messaging allocation is preferably not reallocated until the next positioning request is made, e.g., transmission of the MAP PERFORM LOCATION message to the Serving Mobile Location Center or SMLC in GSM, at which point the positioning timer T is reinitialized with the maximum positioning idle time. It should be understood that the SMLC (corresponding to the MSC 290 in FIG. 2) is the main positioning node for processing location information in GSM. It should, nonetheless, be understood that the processing center or positioning node may be conveniently located at any point that receives the requisite positioning data from the location measurement units, e.g., GEMUs.

Figure 3:
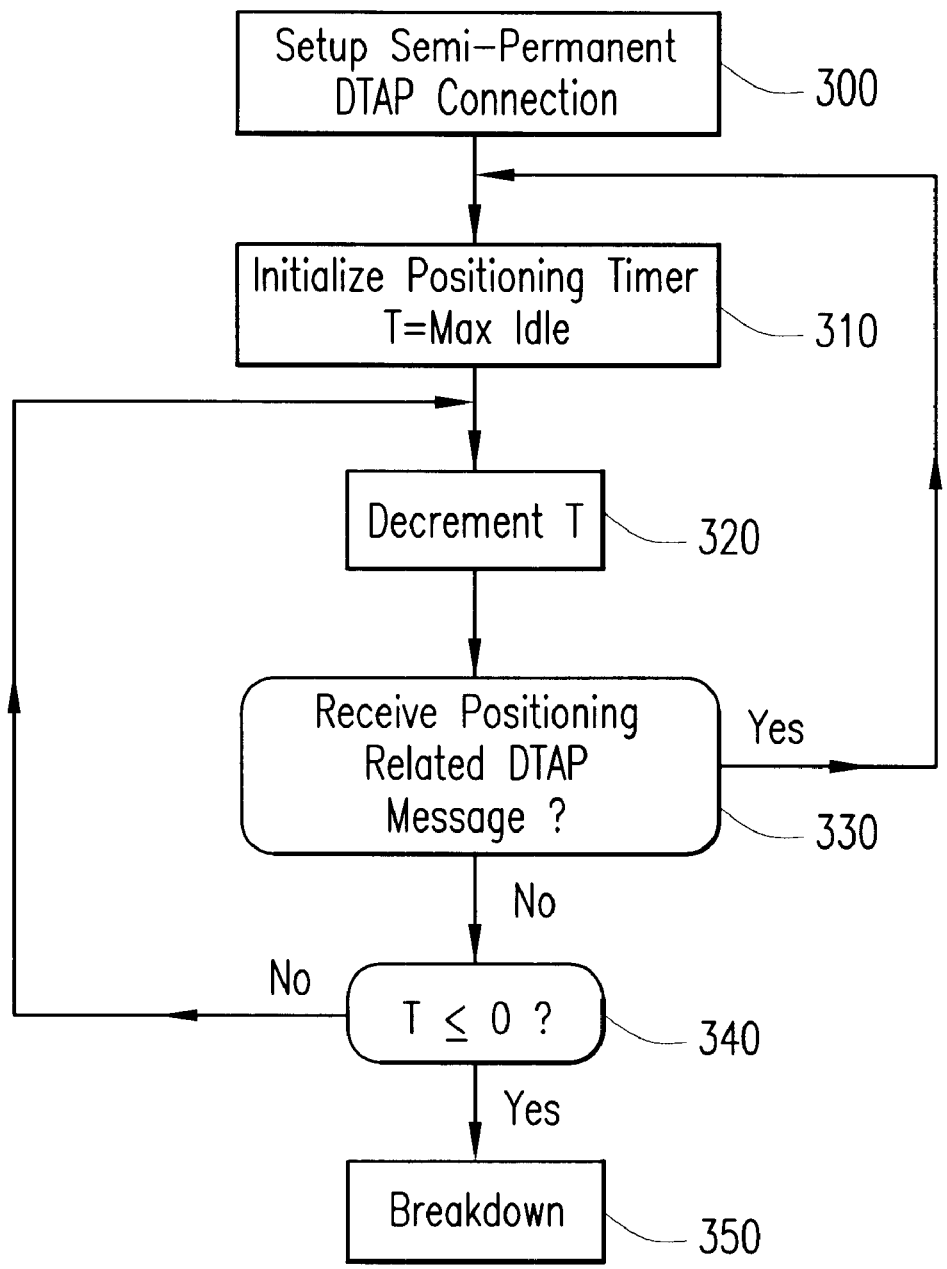
FIG. 3 is a flow chart of a preferred embodiment of the present invention.

A more complete understanding of the present invention may be had with reference to FIG. 3, which depicts a flow chart of a preferred embodiment for practicing the principles set forth in the present invention. The first step is to start the positioning operation, which corresponds to the original position request reception at the MSC 290 or simply the initialization of the positioning feature of the communications system 200 by making a semi-permanent allocation on the SDCCH for positioning-related DTAP messaging between the GEMUs in the telecommunications system 200 and the MSC 290.

The positioning timer T is next initialized with a maximum positioning idle time MAX IDLE (box 310) which immediately begins decrementing (box 320). Control is then transferred to box 330 where polling for reception of positioning-related DTAP messaging between the GEMUs and the MSC 290 is requested, i.e., transmission of a DTAP message to any one of the GEMUs in communications with the MSC 290 or the reception of a DTAP message by the MSC 290 from a GEMU. When a positioning-related DTAP messaging is detected, control is passed back to box 310 where the positioning timer T is reinitialized. If, however, no positioning-related DTAP messaging is detected, polling for positioning timer T expiration is executed at box 340. Control is passed back to box 320 unless the positioning timer T has expired, in which case the DTAP connection is released between all GEMUs and the MSC 290 (box 350). In this event, the DTAP connections and resources are broken down and will not be reallocated until the positioning feature is reinitialized or a MAP PERFORM LOCATION message is received by the SMLC.

The inclusion of a positioning timer within the MSC 290 as presently set forth in the instant application allows for more efficient utilization of the rather limited § 20 and BSS 30 resources. This is clearly critical if the network load is high and, thus, a corresponding demand for control channel resources is great. Furthermore, since the DTAP messaging occurs over the SDCCH, unnecessary allocation of a DTAP channel for positioning during periods of positioning inactivity may significantly decrease the network capability for efficient and timely information transmissions, e.g., SMS messaging or cell broadcast messages. Moreover, although each GEMU requires, at best, only a single timeslot of the SDCCH for DTAP messaging, implementation of the instant invention, as described herein, on a network-wide scale with large resource allocations may result in significant bandwidth savings.

It should be understood that the timer T may operate as an incremental timer, i.e., counting forward to a given timeout value upon which the resources are cleared, or a decremental timer which starts with the timeout value (MAX IDLE) and decrements backwards until zero, upon which the resources are reallocated for other usages, as discussed in more detail hereinabove.

The previous description is of preferred embodiments for implementing the invention, and the scope of the invention should not necessarily be limited by this description. The scope of the present invention is instead defined by the following claims.

What is claimed:

1. A telecommunications system for positioning a mobile terminal therein, said telecommunications system comprising:
   a plurality of location measurement units, each of said location measurement units receiving access bursts from said mobile terminal and generating positioning data corresponding thereto;
   a positioning node for receiving said positioning data from said location measurement units across a data connection, the data connection being allocated for communication between the location measurement units and the positioning node during periods of determining mobile terminal positioning; and
   a timer in communication with said positioning node and said data connection, said timer being reset each instance said positioning data corresponding to the mobile terminal and transmitted across said data connection is received by said positioning node, whereby, after said timer has run for a given timeout period following a reset thereof without said positioning node having been received said positioning data, said data connection is released.

2. The telecommunications system according to claim 1, wherein said plurality of location measurement units each comprise:
   a base transceiver station for receiving said access bursts from said mobile terminal; and
   a Generic Measurement Unit for receiving time of arrival data for said access bursts from said mobile terminal.

3. The telecommunications system according to claim 2, further comprising a base station controller for receiving respective positioning data from respective Generic Measurement Units.

4. The telecommunications system according to claim 1, wherein said positioning node is a Mobile services Switching Center.

5. The telecommunications system according to claim 1, wherein said positioning node is a Serving Mobile Location Center.

6. The telecommunications system according to claim 1, wherein said data connection comprises a control channel.

7. The telecommunications system according to claim 6, wherein said control channel comprises a stand alone Dedicated Control Channel.

8. The telecommunications system according to claim 1, wherein said location measurement units communicate with said positioning node pursuant to Signaling System Number 7 protocols.

9. The telecommunications system according to claim 8, wherein said location measurement units communicate with said positioning node pursuant to Direct Transfer Application Part protocols.

10. The telecommunications system according to claim 1, wherein after said given timeout period has expired with no positioning data transference across said data connection, a plurality of resources associated with said data connection are reallocated.

11. A method for positioning a mobile terminal in a telecommunications system, said method comprising the steps of:

receiving, at a plurality of location measurement units, access bursts from said mobile terminal;

generating, at said plurality of location measurement units, respective positioning data corresponding to positioning said mobile terminal;

transferring, from said plurality of location measurement units, said respective positioning data to a positioning node across a data connection allocated for the transference of the respective positioning data; and measuring, by a timer, the time of allocation of said data connection, said timer being reset upon reception by said positioning node of each transference of said respective positioning data across said data connection, said data connection being deallocated after said timer has run for a given timeout period without the transference of said respective positioning data across said data connection.

12. The method of claim 11, wherein:

said transferring step transfers said respective positioning data utilizing a Direct Transfer Application Part protocol.

13. The method of claim 11, wherein:

said data connection comprises a semi-permanently allocated data connection.

14. The method of claim 11, wherein:

said data connection comprises a stand alone dedicated control channel.

15. A method for performing a positioning determination of a mobile terminal within a telecommunications system, said method comprising the steps of:

establishing a data connection between at least one location measurement unit and a position calculating node within said telecommunications system;

communicating positioning information of said mobile terminal between said at least one location measurement unit and said position calculating node over said established data connection as a plurality of messages communicated thereover;

measuring a period of time between consecutive messages containing positioning information communicated between said at least one location measurement unit and said position calculating node over said established data connection; and terminating said data connection between said at least one location measurement unit and said position calculating node in response to said measuring step.

16. The method of claim 15, wherein:

said terminating step terminates said established data channel upon said measured period of time exceeding a predetermined period of time.

17. The method of claim 15, wherein:

said communicating between said location measurement unit and said positioning calculating node utilizes a Direct Transfer Application Part protocol.

18. The method of claim 15, wherein:

said data connection comprises a semi-permanently established data connection.

19. The method of claim 15, wherein:

said terminating step terminates said data connection responsive to completion of said communicating step.

20. The method of claim 15, wherein:

said positioning information comprises Time Of Arrival (TOA) based data measured by said location measurement unit.

21. A telecommunications system for determining a position of a mobile terminal therein, comprising:

a plurality of location measurement units for receiving signals from said mobile terminal and measuring time parameters associated with said received signals;

a node for communicating with said location measuring units and calculating a position of said mobile terminal based upon said measured time parameters, said communicating comprising a plurality of messages transported between said location measurement units and said node over an allocated control channel; and a timing element for measuring a period of time between successive messages transported between said location measurement units and said node, and for releasing said allocated control channel upon an affirmative detection of a measured period of time exceeding a predetermined timeout value.

* * * * *